United States Patent [19]
Haen

[11] Patent Number: 5,355,868
[45] Date of Patent: Oct. 18, 1994

[54] HEAT DISTRIBUTION ARTICLE FOR COOKING GRILLS

[75] Inventor: William G. Haen, Racine, Wis.

[73] Assignee: Greene Manufacturing Co., Racine, Wis.

[21] Appl. No.: 71,545

[22] Filed: Jun. 4, 1993

[51] Int. Cl.$^5$ .............................. F24C 3/14; F24C 3/00
[52] U.S. Cl. .................... 126/41 R; 126/153; 99/401; 99/447
[58] Field of Search ............... 126/25 R, 39 R, 41 R, 126/153; 99/444, 447, 401

[56] References Cited

U.S. PATENT DOCUMENTS

| | | | |
|---|---|---|---|
| 700,061 | 5/1902 | Lucas | 126/172 |
| 871,266 | 11/1907 | Gertenbach | 126/153 |
| 1,038,849 | 9/1912 | Carter | 126/41 R |
| 1,320,497 | 11/1919 | Schey . | |
| 1,561,543 | 11/1925 | Hoult | 126/153 |
| 3,288,050 | 11/1966 | Saiki | 99/447 |
| 3,593,647 | 7/1971 | Copeland, Jr. | 126/41 R X |
| 3,989,028 | 11/1976 | Bergen | 126/41 R |
| 4,240,398 | 12/1980 | Lindop | 126/25 R |
| 4,428,281 | 1/1984 | Miller | 99/445 |
| 4,446,776 | 5/1984 | Gelfman | 99/401 |
| 4,510,855 | 4/1985 | Avner | 99/450 |
| 4,703,746 | 11/1987 | Hitch | 126/25 R |
| 4,784,109 | 11/1988 | Korpan | 126/25 R |
| 4,896,652 | 1/1990 | Geiter | 126/41 R |
| 4,909,137 | 3/1990 | Brugnoli | 99/444 |
| 4,936,202 | 6/1990 | Lin | 99/425 X |
| 4,942,862 | 7/1990 | Alden et al. | 126/337 R |
| 4,969,449 | 11/1990 | Levin | 126/332 |
| 5,101,805 | 4/1992 | Noh | 126/273 R |
| 5,105,725 | 4/1992 | Haglund | 99/446 |
| 5,111,803 | 5/1992 | Barker et al. | 126/41 R |
| 5,133,333 | 7/1992 | Scott | 126/25 R |

FOREIGN PATENT DOCUMENTS

| | | | |
|---|---|---|---|
| 240951 | 1/1960 | Australia | 126/41 R |
| 13438 | of 1902 | United Kingdom | 126/153 |
| 139012 | 2/1920 | United Kingdom | 126/153 |
| 217799 | 6/1924 | United Kingdom | 126/41 R |
| 510645 | 4/1939 | United Kingdom | 99/444 |
| 581304 | 8/1946 | United Kingdom | 126/39 R |

Primary Examiner—Carl D. Price
Attorney, Agent, or Firm—Jannson & Shupe Ltd.

[57] ABSTRACT

Disclosed is a new "universal" heat distribution article for replacing a rack supporting lava rock or a custom-fitted heat distribution plate. The article includes at least a pair of plates (and preferably four plates), each of which has rows of apertures. The plates are in partial overlapping contact with one another and those apertures at the kettle central region are at least partially closed by the other plate. On the other hand, those plate apertures at the kettle side perimeter regions are fully open. Upward air flow at the kettle central region is restricted, heat is distributed toward the sides of the kettle and the temperature gradient across the cooking surface is materially improved. A retrofit kit and details of the heat distribution plate are also disclosed.

18 Claims, 8 Drawing Sheets

HEAT DISTRIBUTION ARTICLE FOR COOKING GRILLS

FIELD OF THE INVENTION

This invention relates generally to stoves and furnaces and, more particularly, to grill-type cooking apparatus.

BACKGROUND OF THE INVENTION

Preparation of food often involves cooking. Grills, usually of the type used outdoors, are used to prepare meat, fish and vegetables and are considered by many to lend a unique flavor to such foods and to the ambience surrounding their preparation. Heat sources commonly used in such grills include gas and charcoal. The popularity of outdoor cooking grills is evident from the fact that there are well over 2.5 million outdoor grills sold in the United States each year.

Earlier cooking grills include a kettle within which is placed an intermediate "barrier" embodied as a rack interposed between the burner and the food-supporting grate. The rack supports individually-placed ceramic briquettes or lava rocks arranged in a way to help distribute heat toward the outer edges of the grill. And most of the grease and other liquid dripping from the food lands on the briquettes or rock rather than on the burner. Flame "flare-ups" are thereby substantially avoided.

A disadvantage of rack-supported briquettes or lava rocks is that they must be rather precisely placed with consistent rock-to-rock spacing to avoid "hot spots." And if a user moves the cooking grill to a new location, there is a high likelihood that even with precise initial placement, the positions of some rocks will change and will not be re-adjusted.

More recently, manufacturers of such cooking grills have used a metal heat distribution plate as the intermediate barrier in place of the rack and briquette or rock. Plates of this type (which are sized and shaped to fit a particular cooker kettle) have holes, e.g., slits or the like, placed in selected locations. Such locations are selected to distribute heat toward the edges of the cooking grate. And the mere presence of the plate helps stop grease and other liquids from dripping onto the burner or to the bottom of the kettle.

Since such plates rust and/or otherwise deteriorate over time, there is a growing market for replacement heat distribution plates. Rock-supporting racks are also subject to deterioration and owners of grills having such racks are increasingly using heat distribution plates as a replacement substitute therefor. While replacement heat distribution plates are available from the grill manufacturer (and perhaps from others), each is a one-piece plate sized and shaped to fit a particular kettle. Kettles ranging in size from 8" wide by 13" long to 14.5" wide by 24.5" long are commonly used as components of cooking grills.

Examples of cooking grills and similar products are shown in U.S. Pat. Nos. 3,288,050 (Saiki); 4,703,746 (Hitch) and 5,101,805 (Noh). The Saiki patent shows a circular, disc-like adjustable food-supporting grate particularly suited for an hibachi. The grate has two stacked plates concentric with one another and relatively adjustable one to the other in use. The plates are custom sized to fit the open-topped "mouth" of the hibachi or fire pot with which they are used and cannot be adapted to fit a variety of hibachi or pot sizes.

The Hitch and Noh patents both show heat control mechanisms using two grate-like members one above the other. Such mechanisms are configured to fit a kettle (Hitch) or an oven (Noh) of a particular size. For either type of heat control mechanism, all of the openings across the entire cooking surface area are required to be open or partially or fully occluded to the same degree. That is, there is no way for openings near the center of the members to be more fully closed than those near the edges of the members.

A commonly-available heat distribution plate is shown in a Thermos ® product catalog sheet. Such plate is said to fit all Structo ® and Thermos ® 42,000 BTU grills; that is, the plate is dimensioned (in length and width) for a particular kettle size. Commonly-available kettle sizes are as follows: 11.5 inches by 19 inches; 12.75 inches by 19 inches; 14.5 inches by 21.5 inches; 15.5 by 24.5 inches and 15 inches by 26.5 inches. However, there are a few variations from these more-or-less standard sizes and other variations may be developed in the future.

While these prior art products involving heat distribution plates and lava rock arrangements have been generally satisfactory, they are nevertheless attended by certain disadvantages. One disadvantage (which is very pronounced in grills with lava rock arrangements) is that the temperature "gradient" of the cooking grate, i.e., the difference in grate temperature between the hottest area and the coolest area, can be very substantial.

The magnitude of the temperature gradient and the precise locations of those parts of the grate cooking surface which are hottest and coolest tend to vary with specific grill configuration, with the direction of any wind-related draft and according to whether the grill is equipped with a heat distribution plate, with a rack holding lava rocks or with neither. However, a few general observations can be made.

With neither a heat distribution plate nor a rock rack, the hottest part of the grate is usually at the center directly above the burner. With either a heat distribution plate or a rock rack, the usual hottest area of the cooking surface is at the rear of the grate where heat is "ventilated." The coolest areas of such surface are at the grate corners. And generally, the front portion of the cooking surface toward the user is somewhat cooler than the rear portion.

The following helps appreciate the effect of temperature gradient upon the quality of the cooked food product. When a cooking grill exhibits a temperature gradient of less than about 140°–160° F. (which is relatively common when the grill has a custom-sized heat distribution plate and rare with grills using lava rock), food need not be periodically moved on the grate to obtain relatively uniformly cooked product.

But as the magnitude of the gradient increases above about 140°–160° F., the more imperative it becomes to move food, e.g., hamburgers, from place to place on the cooking surface to obtain a uniformly-cooked product. Users of grills, especially of the type having lava rock or briquettes as a means of heat distribution, are all-too-familiar with burgers which are well done at those portions nearer the rear of the grate and rare or even raw at those portions nearer the grate front or corners.

As an example of the magnitude of commonly-occurring temperature gradients, tests were conducted on a kettle measuring 15 inches between the front and rear sides and 26.5 inches between the lateral kettle ends. Such kettle was equipped with a conventional heat distribution plate (as may be furnished by the grill original equipment manufacturer or "OEM") and the temperature gradient across the cooking grate was about 130° F. The hottest temperature, about 775° F., was at the grate rear portion and the coolest temperature, about 645° F., was at the grate corners. Similarly-measured temperature gradients involving smaller kettle sizes were less than 130° F.

As another example, tests on the same kettle equipped with a rack supporting lava rock (as may also be furnished by the grill OEM) demonstrated that the temperature gradient was about 285° F. The hottest temperature, about 980° F., was at the grate rear portion and the coolest temperature, about 695° F., was at and near the grate corners. Such gradients in smaller kettle sizes ranged above and below 285° F.

A characteristic of prior art arrangements is that lava rock support racks and heat distribution plates are dimensioned to fit a particular kettle size. Several disadvantages result. Since there are at least five sizes of rectangular kettles used with currently-available cooking grills, the rack or plate manufacturer (especially one selling such racks or plates in the replacement market) must make and stock all sizes or forego sales as to those sizes not produced.

Similarly, distributors and other re-sellers of such products must carry a rather substantial inventory of racks and/or plates to broadly meet the needs of their customers. Inventory, especially a large inventory, has unfavorable implications involving inventory carrying costs and warehouse space.

Another disadvantage is that because of the "size-specificity" of the racks and plates, they do not lend themselves to sale in kit form for universal application in grill kettles of any of a variety of sizes. It might be said that they lack "universality" in application.

OBJECTS OF THE INVENTION

It is an object of the invention to provide a heat distribution article overcoming some of the problems and shortcomings of the prior art.

Another object of the invention is to provide a heat distribution article which adapts to a wide variety of cooking grill kettle sizes.

Another object of the invention is to provide a heat distribution article which reduces the temperature gradient across the cooking surface of a grill.

Still another object of the invention is to provide a heat distribution article which is substantially universal in application and replaces OEM heat distribution plates and arrangements using lava rock.

Yet another object of the invention is to provide a heat distribution article which may be conveniently sold in kit form.

Another object of the invention is to provide a heat distribution article which is easy to manufacture. How these and other objects are accomplished will become apparent from the following descriptions and from the drawing.

SUMMARY OF THE INVENTION

The invention involves a heat distribution plate for use in a cooking grill. Such plate is used in combination with one or more additional plates to provide a new and novel heat distribution article replacing conventional heat distribution articles such as specifically-sized heat distribution plates and racks supporting lava rock or ceramic briquettes.

A highly preferred plate includes a generally planar sheet metal body and a plurality of reinforcing ribs formed in the body. Preferably, the ribs extend along a straight line and the ribs comprising at least one pair of adjacent ribs are spaced apart by a dimension.

The plate also has a plurality of slot-like apertures formed in the body and arranged in rows. The apertures of each row are disposed along a row axis and the rows comprising at least one pair of adjacent rows are spaced apart by the same dimension. The apertures in the plate, and preferably those in all plates when the plate is assembled with one or more additional plates, are elongate in the direction of the row axes. As will become apparent, the novel plate may be used with other plates to form a new heat distribution article replacing OEM heat distribution plates and lava rock and rock support racks.

Other aspects of the invention relate to an improvement in the combination of (a) a generally rectangular cooking grill kettle having a central region, side perimeter regions, a pair of kettle ends and a pair of kettle sides, and (b) a heat distribution article mounted in the kettle intermediate the burner and the cooking grate. In the improvement, the article comprises a pair of plates, i.e., first and second plates and, as described below, the article preferably comprises four plates.

The plates are in partial overlapping contact with one another and for each plate, those apertures at the kettle central region (generally, directly above the burner) are at least partially closed by the other plate. On the other hand, those plate apertures at the side perimeter regions (each region being a strip-like region adjacent to each kettle side) are fully open. Upward air flow at the central region is thereby restricted, heat is distributed toward the sides and ends of the kettle and food drippings are substantially prevented from falling to the burner. As explained in the detailed description, the relative evenness of heat distribution is remarkable.

Further, each plate includes a plurality of alignment projections and each projection has a concave portion and a convex portion. When two plates are used together, the convex portion of at least one projection of the first plate contacts the concave portion of at least one projection of the second plate. In a highly preferred embodiment, the alignment projections are continuous and rib-like. When so formed, such projections reinforce the plate and help avoid plate warping.

A particularly desirable feature of the improvement relates to the facts that the article including plural plates fits a wide variety of rectangular kettle sizes while yet providing adequate open areas at the kettle ends to help prevent heat buildup and poor "sooty" combustion. The row axes are spaced apart by a dimension and the projections are spaced apart by about the same dimension.

In that way, the rows of apertures of a particular plate are generally in registry with rows of apertures of another plate, irrespective of which particular projections of such plates are aligned and "nested" with one another. These relationships permit plate arrangement so that apertures at or near the kettle central region may be at least partially closed while those near the kettle side perimeter regions are open—greatly improved heat distribution results.

One specific arrangement involves only two plates, the lengths of which are selected to provide heat-relieving "gaps" at the kettle ends which range in width from about one inch to about two inches. In other words, the length of the plates (the dimension measured parallel to the kettle long axis) is from two inches to four inches less than the dimension between the kettle ends. Further, the width of each such plate (the dimension measured parallel to the kettle short axis) is less than the width of the kettle.

In such arrangement (which might be termed a "side edge overlap" arrangement), each plate has a pair of end edges and a pair of side edges. A side edge (and only one side edge) of each plate is substantially in contact with a separate side of the kettle. The end edges of the plates are substantially aligned and are spaced from the ends of the kettle. In the central region where the plates overlap, apertures are partially closed while those along the kettle perimeter regions are open.

In another, most highly preferred embodiment best suited for providing a heat distribution article for a wider variety of kettle sizes, the article comprises four plates. As mentioned above, each plate has at least two rows of apertures, the apertures of each row are disposed along a row axis and the plates are in partial overlapping relationship with one another. Apertures at the kettle central region are at least partially closed by another plate while apertures at the side perimeter regions are fully open.

The article is preferably sold in kit form including plates and bolting hardware. As will become more apparent from the detailed description and the drawing, a properly-constituted kit assembles into a heat distribution article for use in any of a wide variety of kettle sizes used in cooking grills.

The kit includes at least two plates and each plate has apertures as mentioned above. Each plate also includes a plurality of alignment projections for matching with the alignment projections of other plates. The plates are contained in a common package. Preferably, such kit includes four plates, all of which are substantially identical to one another.

In the preferred kit, the rows of apertures in each plate are generally parallel and are spaced apart by a dimension and the alignment projections are rib-like and are spaced apart by about the same dimension. The dimension is preferably in the range of about two inches to about three inches and, most preferably, is about 2.4 inches. It has been found that with such dimensional spacing, the plates can be adapted to all of the currently-available kettle sizes. When properly installed in any one of such kettles, the clearance between the plate end and the end of the kettle is no less than about one inch and no more than about two inches and thus provides an ideal heat relief area.

Other details of the invention are set forth in the following detailed description and in the drawing. In the description, reference is made to the fact and manner of "heat" distribution. This is merely a shorthand way of referring to distribution of air containing thermal energy, i.e., heat.

DETAILED DESCRIPTIONS OF PREFERRED EMBODIMENTS

Referring first to FIGS. 1-4, the invention involves a relatively flat heat distribution article 10 assembled from plates 11 and in the most highly preferred embodiment, four plates 11 are used. The article 10 is adjustable to fit virtually any one of the wide variety of rectangular grill kettles 13 currently available including (but not necessarily limited to) the five specific sizes mentioned in the Background of the Invention.

Depending upon the particular version of the article 10, its overall size is adjustable in two dimensions (for the most highly preferred four-plate version) or in one dimension (for each of the two-plate versions). Adjustment in one dimension, that between the sides of a kettle 13, is in a continuum while adjustment in the other dimension, that between the kettle ends, is in increments. The new article 10 is universal in application for retrofitting cooking grills having conventional lava rock arrangements or heat distribution plates.

Figure 1:
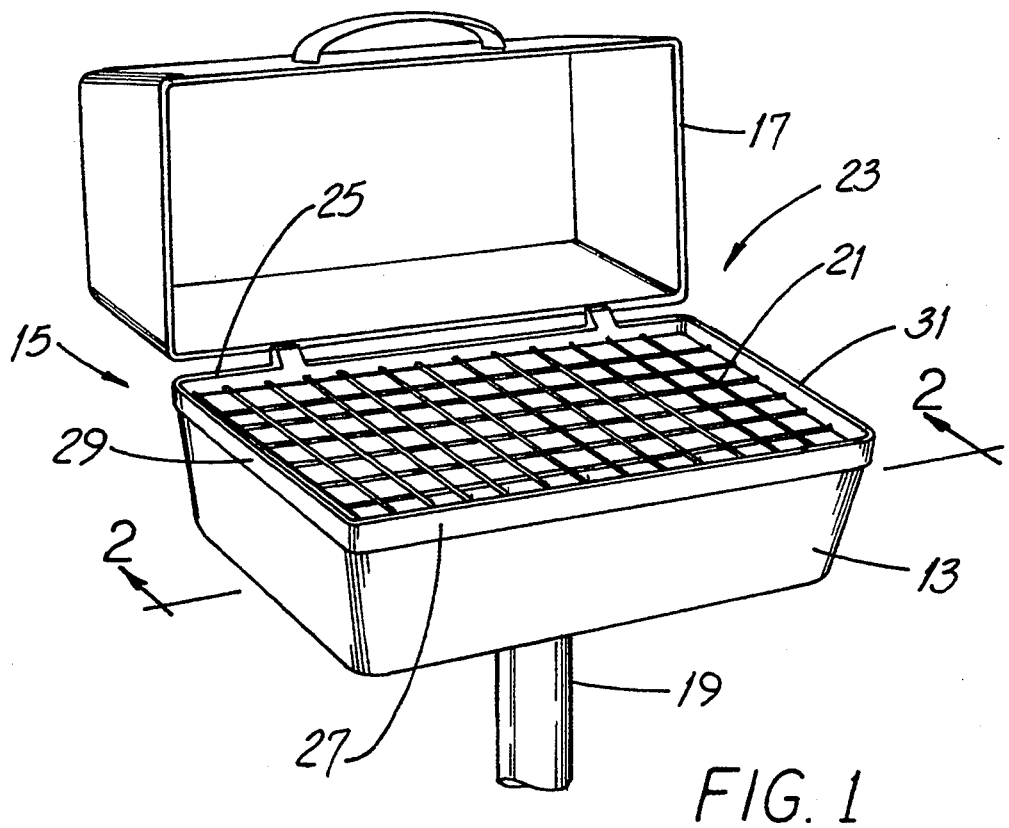
FIG. 1 is a perspective view of a cooking grill (with part broken away) having an exemplary heat distribution article therein.

Before describing the new heat distribution plate 11 and the various versions of the article 10 made therefrom, it will be helpful to have an understanding of the general arrangement of a cooking grill 15. FIG. 1 shows a grill 15 having a generally rectangular kettle 13, a tip-up cover 17, a support post 19 and a cooking grate 21 providing the cooking surface 23 where food is placed.

The kettle 13 has a rear side 25 (the side away from the user), a front side 27 and a pair of lateral ends 29, 31. The front and rear edges of the cover 17 are spaced somewhat farther apart than the kettle sides 25, 27. The cover 17 therefore "overbites" the sides 25, 27, leaving air-flow openings so that air circulates into the front opening, along the underside of the cover and out the rear opening.

Figure 2:
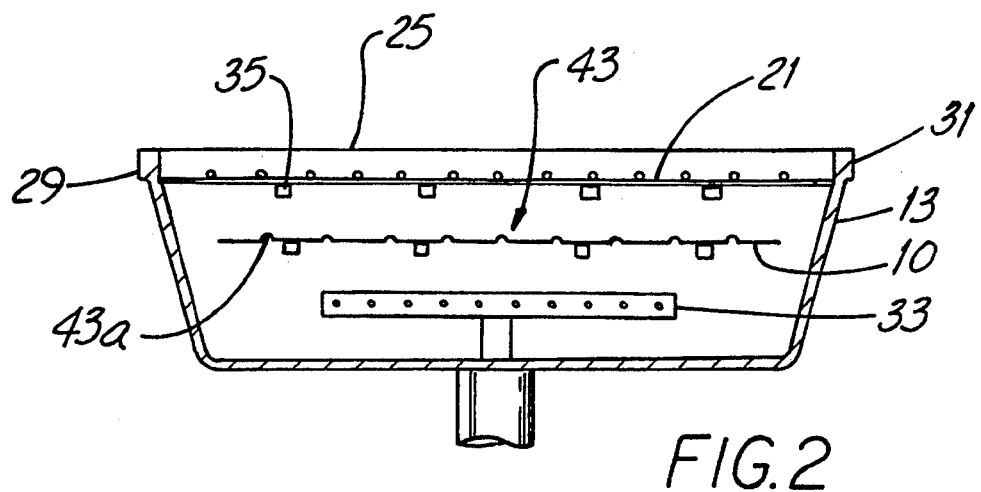
FIG. 2 is a cross-sectional elevation view of the grill of FIG. 1 taken along the viewing plane 2—2 thereof.

FIG. 2 shows components which are mounted to the kettle 13. Such components include a heat source 33 embodied as a gas burner (or as a bed of charcoal, not shown) and the cooking grate 21. The grate 21 is supported at the kettle top by "ears" 35 cast as part of the kettle 13 and projecting toward the kettle interior. Typically, such ears 35 are on and project inward from the kettle sides 25, 27 but not its ends 29, 31.

Between the heat source 33 and the grate 21 is an exemplary heat distribution article 10 which may be embodied as any one of several versions. (For reasons of preliminary explanation, the depiction of article 10 in FIG. 2 is simplified.)

Figure 5:
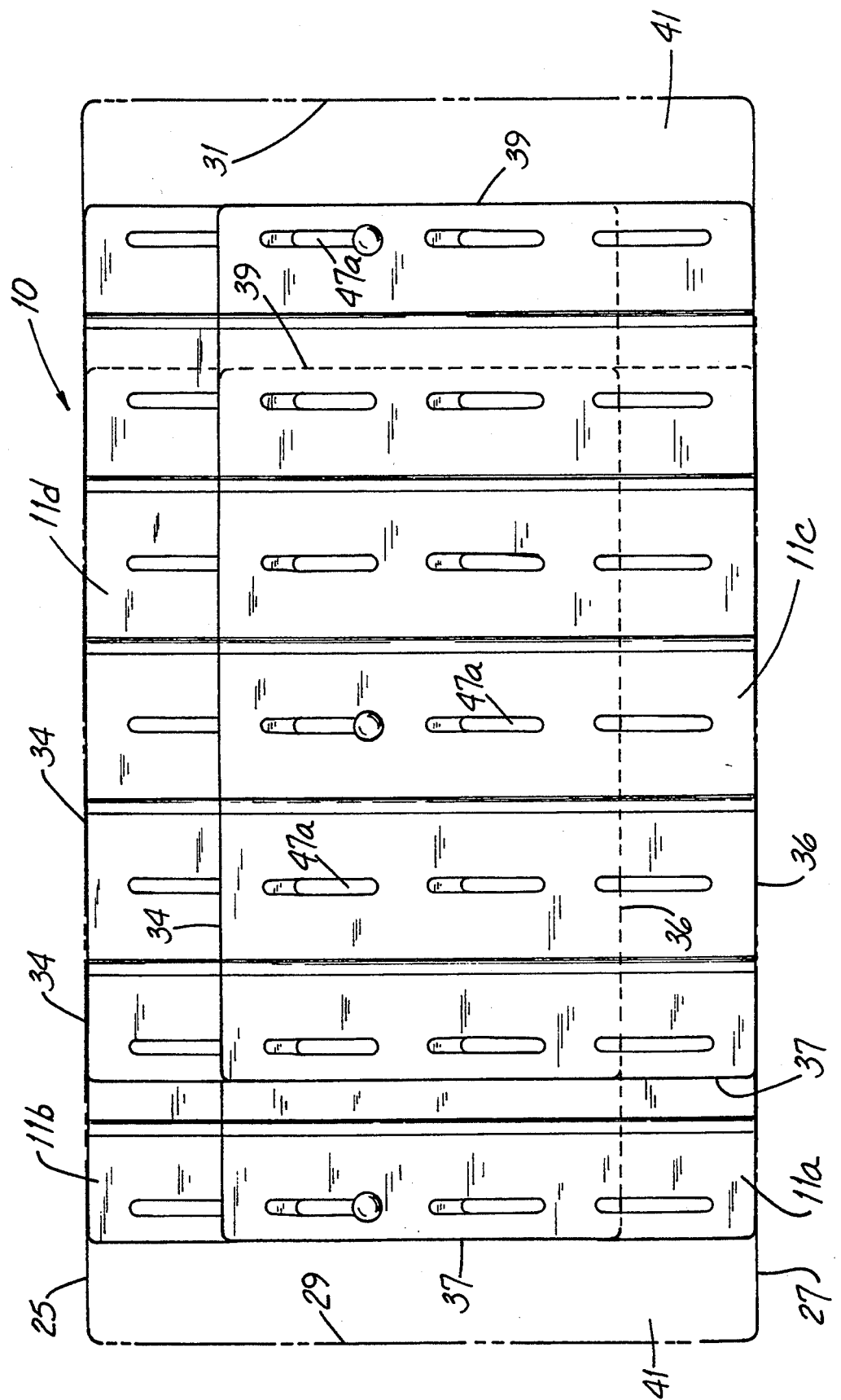
FIG. 5 is a top plan view of the assembled heat distribution article of FIG. 4 shown in conjunction with a cooking grill kettle in dashed outline.
Figure 6:
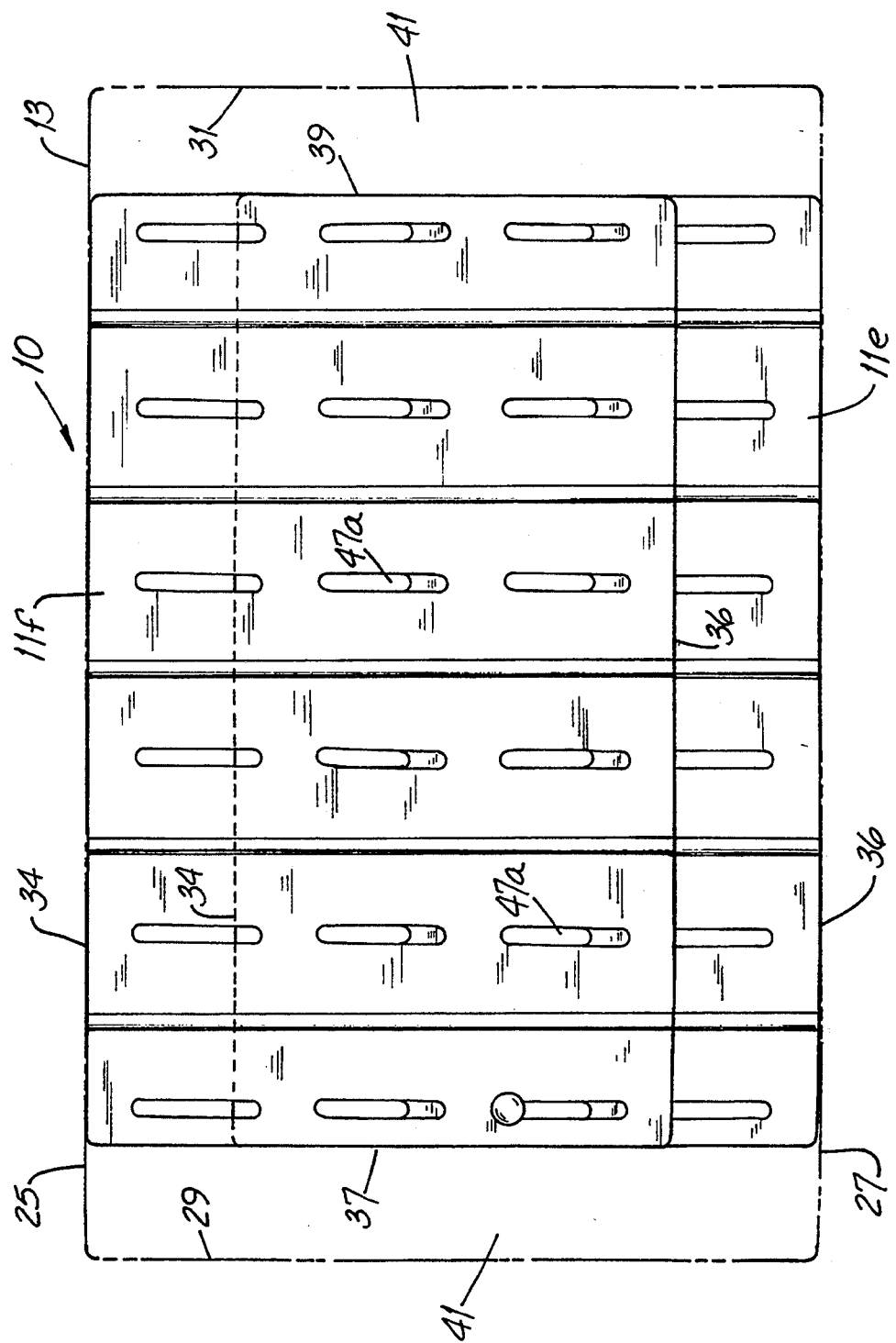
FIG. 6 is a top plan view of another embodiment of the assembled heat distribution article (the two-plate, side-edge-overlapped version) shown in conjunction with a cooking grill kettle in dashed outline.

Referring also to FIGS. 5 and 6, for any heat distribution article 10 or, for that matter, any conventional prior art heat distribution plate, it is preferred that the side edges 34, 36 of the article 10 contact or be very closely adjacent to the kettle front and rear sides 25, 27, respectively. It is also preferred that each end edge 37, 39 of the article 10 be spaced from the corresponding end 29, 31, respectively of the kettle 13 so that air can flow and heat can escape from the resulting gaps 41. Aspects of the invention respond to these needs in a unique and highly innovative way.

Figure 3:
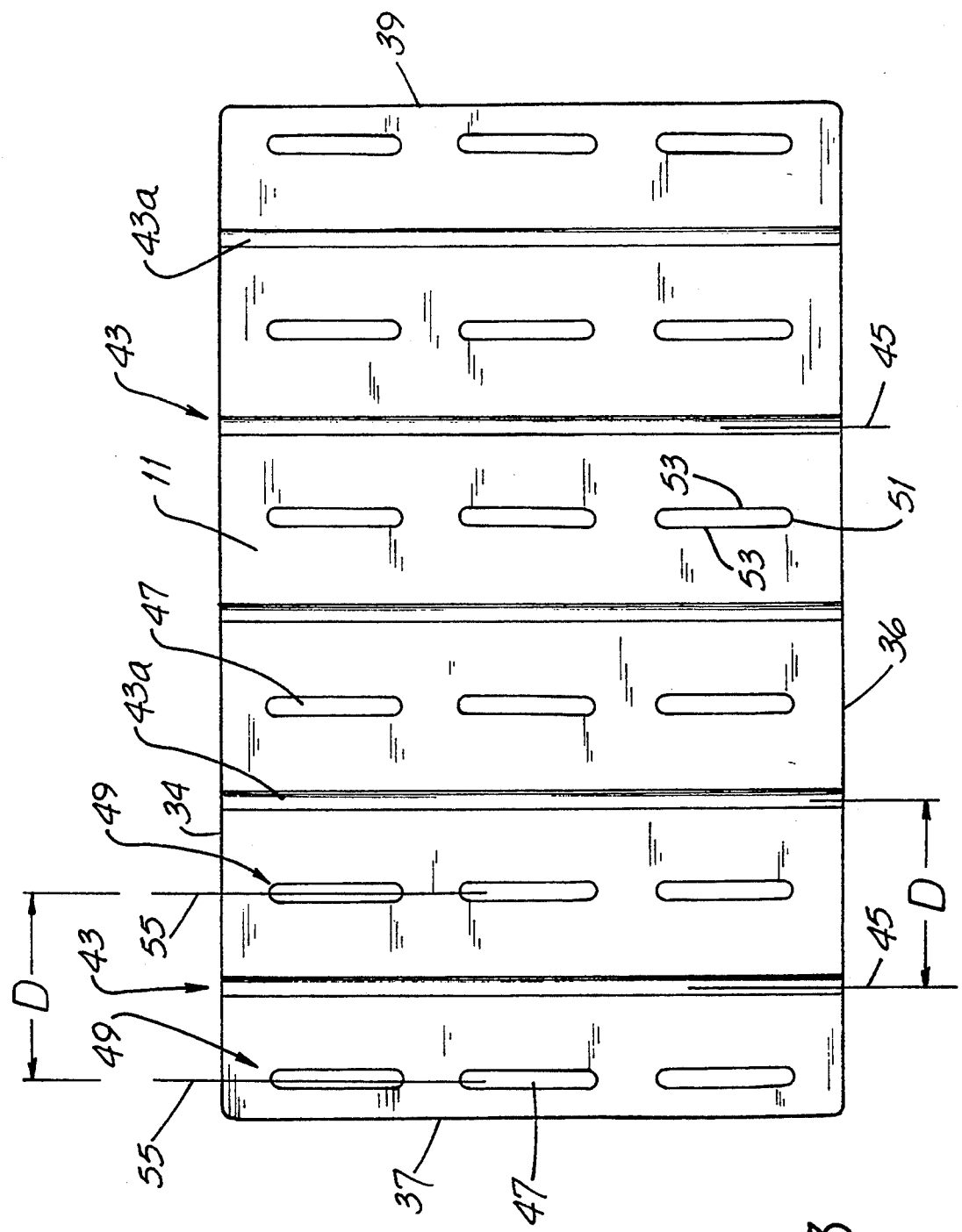
FIG. 3 is a top plan view of a heat distribution plate used to assemble various version of the inventive heat distribution article.

In a highly preferred article 10, all article arrangements are based upon and use the heat distribution plate 11 shown in FIG. 3. Features of such plate 11 will now be explained.

The plate 11 is substantially flat, rectangular and made of sheet metal. Such plate 11 has a pair of spaced, parallel side edges 34, 36 and a pair of spaced, parallel end edges 37, 39 each of which is generally normal to the side edges 34, 36.

The plate 11 also includes a plurality of alignment projections 43 and in use, the plate 11 is positioned in the kettle 13 so that such projections 43 extend upward as shown in FIG. 2. In a highly preferred plate 11, the projections 43 are embodied as continuous reinforcing ribs 43a formed in the plate 11. Each rib 43a extends along a straight line 45 and the ribs 43a comprising at least one pair of adjacent ribs 43a are spaced apart by a dimension "D."

Figure 7:
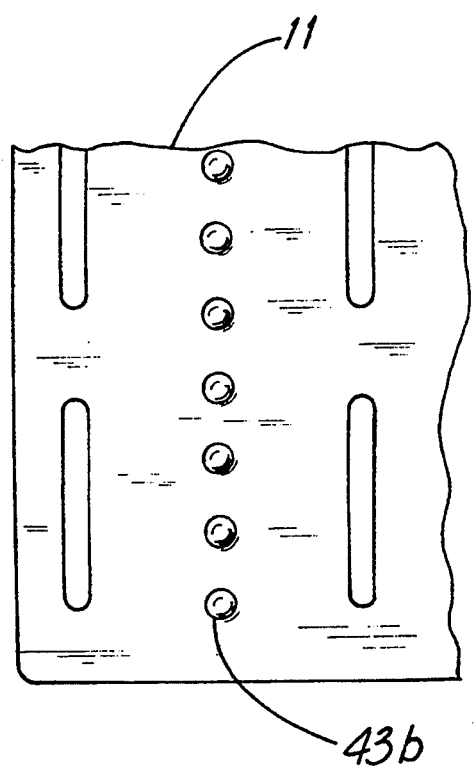
FIG. 7 is a top plan view of a portion of a heat distribution plate generally like that of FIG. 3 and showing an alternate embodiment of alignment projections. Parts of the plate are broken away.

After reviewing this specification, persons of ordinary skill in the art will appreciate that other types of alignment projections 43 can be used, e.g., small cone-like projections 43b, several of which are disposed in line as shown in FIG. 7. While this and similar arrangements are contemplated by the invention, they are less preferred for at two reasons.

One reason relates to the fact that, as described below, plates 11 are aligned and positioned with respect to one another to fit a particular kettle size. Individual projections like projections 43b require that plates 11 be positioned in increments rather than permitting plate positioning in a continuum as with the ribs 43a. Another reason is that the preferred ribs 43a provide the requisite rigidity and help prevent excessive warpage when the plates 11 are exposed to heat. The industry standard requires that heat warpage should not deform any part of a conventional heat distribution plate or a heat distribution article 10 more than about one-half inch from its original plane.

The plate 11 also has a plurality of slot-like apertures 47 formed in the plate 11 and arranged in rows 49. While highly preferred apertures 47 have rounded ends 51 and parallel sides 53 and are elongate in the direction of the row axis 55 along which they are disposed, other aperture shapes and orientations can be used. (And for reasons that will be apparent from the description of how to use the article 10, the sides 53 of apertures 47 are preferably spaced to accept the square shank of a #6 carriage bolt 57 but prevent such shank—and the bolt 57—from turning while being tightened).

The rows 49 comprising at least one pair of adjacent rows 49 are spaced apart by the dimension "D," i.e., the same dimension as used for rib spacing described above. The reason for such rib-to-rib and row-to-row spacing will be more fully appreciated after understanding the description below of how the plate 11 and article 10 are used in a cooking grill kettle 13.

The novel plate 11 is used with one or more additional plates 11 to form a new heat distribution article 10 replacing lava rock and their support racks and replacing OEM heat distribution plates. Various versions of such article 10 will now be described.

Figure 4:
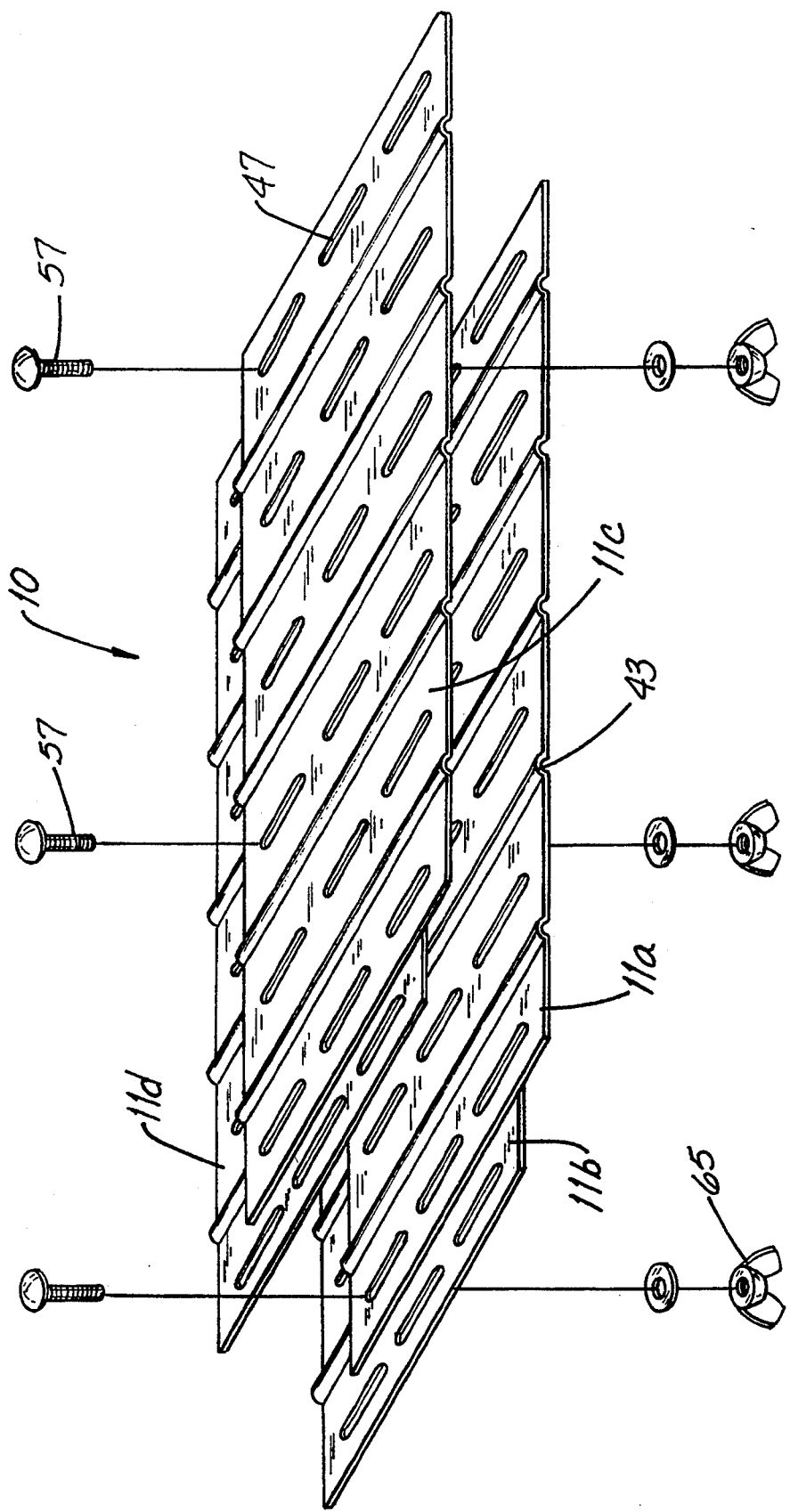
FIG. 4 is a perspective "exploded" view of the most highly preferred embodiment of the heat distribution article (the four-plate version) showing the individual plates thereof in a slightly spaced relationship.

Referring particularly to FIGS. 3, 4 and 5, the four-plate version of the new article 10, the most highly preferred version, will now be described. The article 10 uses four plates 11 arranged with both edge overlap and end overlap. To aid understanding, such plates 11 are identified in FIGS. 4 and 5 as the first plate 11a, the second plate 11b, the third plate 11c and the fourth plate 11d. As viewed in FIG. 5, the left end edges 37 and the right end edges 39 of the two left-side plates 11a and 11b are in respective registry with one another and the lower side edge 36 of the plate 11b is overlapped with the upper side edge 34 of the plate 11a.

Similarly, the left end edges 37 and the right end edges 39 of the two right-side plates 11c and 11d are in respective registry with one another and the lower side edge 36 of the plate 11d is overlapped with the upper side edge 34 of the plate 11c. Further, the right end edges 39 of both left-side plates 11a, 11b are overlapped with the left end edges 37 of both right-side plates 11c, 11d.

It is now apparent that the four plates 11a–11d can be adjusted (with varying amounts of side edge and end edge overlap) to fit a wide variety of kettle sizes. Preferably, each plate 11 is made so that the dimension "D" between ribs 43a and rows 49 of apertures 47 is about 2.4 inches, the plate dimension between end edges 37, 39 is about 13 inches and the plate dimension between side edges is about 8 inches. When so configured, the article 10 fits any of the specific kettle sizes mentioned in the Background of the Invention and provides one-to-two-inch heat relief gaps 41 at the kettle ends 29, 31 when plate ribs 43a are in registry.

Figure 8:
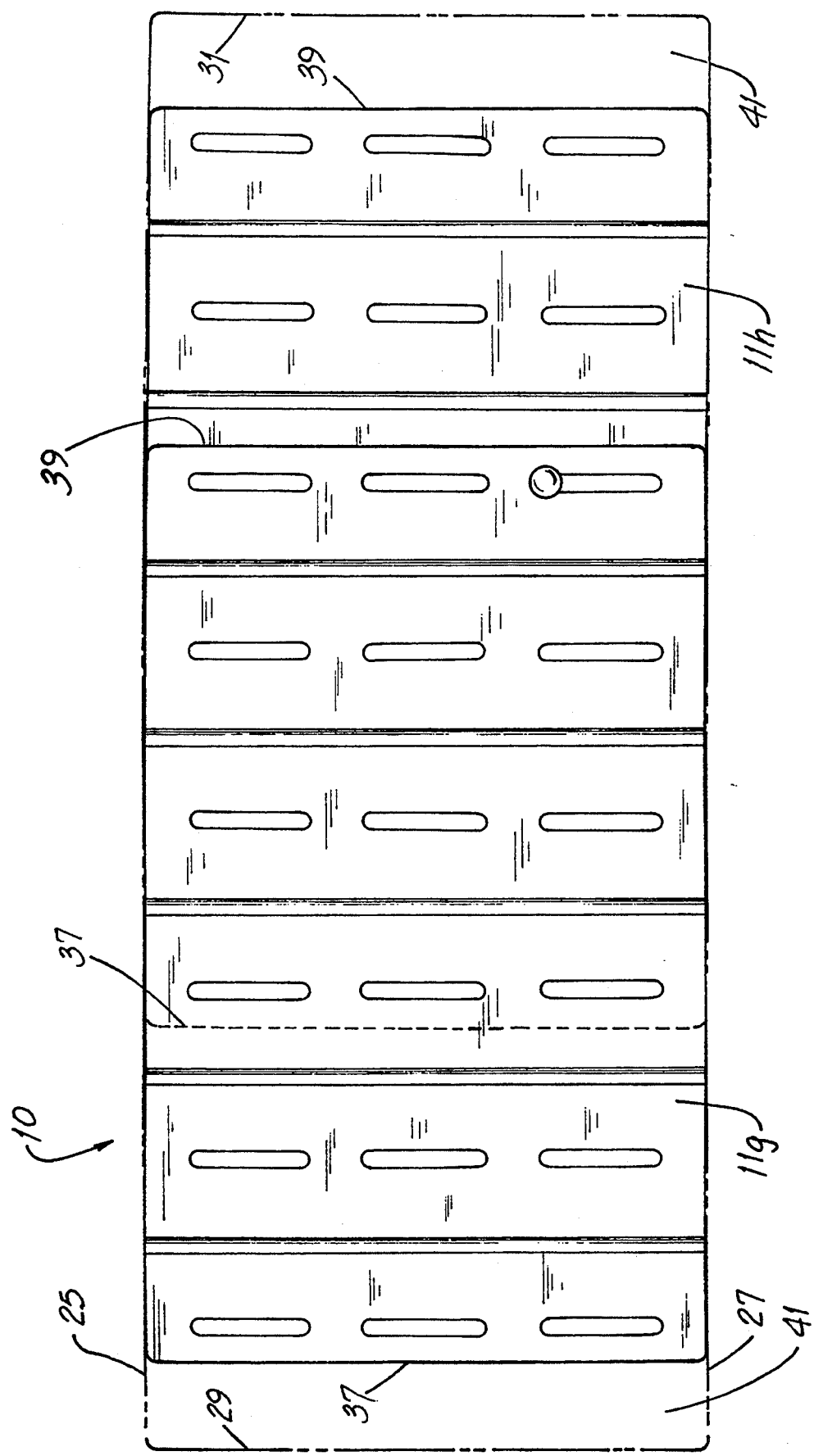
FIG. 8 is a top plan view of yet another embodiment of the assembled heat distribution article (the two-plate, end-edge-overlapped version) shown in conjunction with a cooking grill kettle in dashed outline.

Referring also to FIG. 8, a feature of the four-plate version of the article 10 depicted in FIGS. 4 and 5 is that those apertures 47a in the central region 59 of the kettle 13 where the plates 11 overlap are partially closed while those along the kettle perimeter regions 61 are open. Upward air flow at the central region 59 is thereby restricted and for that reason, the temperature at the cooking surface 23 directly above such region 59 is reduced significantly below that which would occur with fully-open apertures 47.

Figure 9:
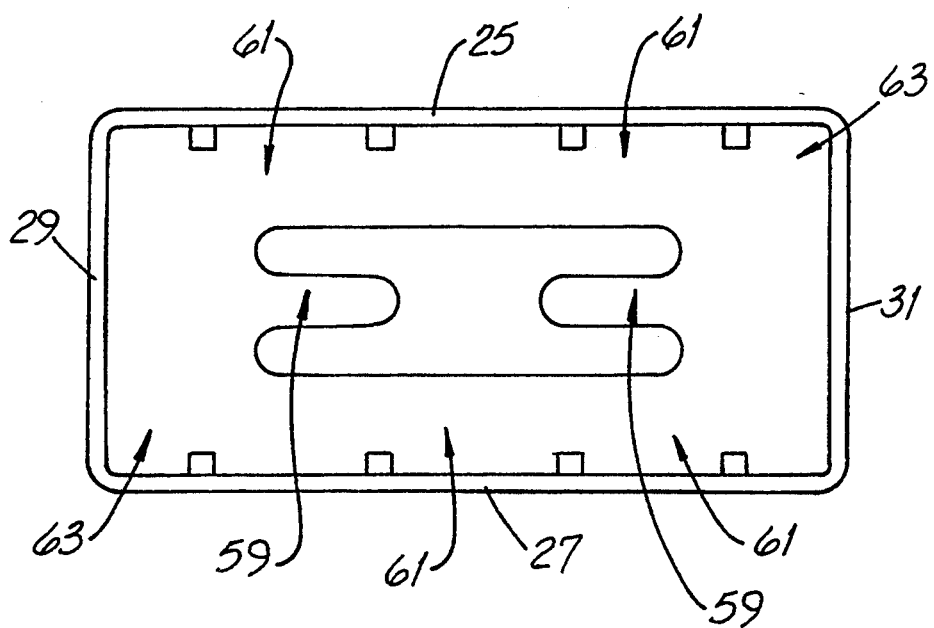
FIG. 9 is a top plan view of the kettle portion of the grill of FIG. 1 shown in conjunction with a gas burner heat source.

Referring also to FIG. 9, heat is distributed toward the perimeter 61 regions of the kettle 13, i.e., toward the kettle corners 63, sides 25, 27 and ends 29, 31 and the temperature gradient of the cooking grate 21 is reduced. Another advantage is that food drippings are substantially prevented from falling to the burner or to the charcoal, as the case may be, and flame "flare-ups" are essentially avoided.

One of the two-plate versions of the article 10 will now be described. Referring additionally to FIG. 6, a pair of plates 11e, 11f is shown installed in a kettle 11. Such plates 11e, 11f are oriented one to the other so that one side edge 34 of the lower plate 11e is partially overlapped with a side edge 36 of the upper plate 11f. The end edges 37, 39 of such plates 11e, 11f are aligned left-to-right.

From FIG. 6 and the above description, it will be appreciated that a side edge 34 or 36 (and only one side edge) of each plate 11e, 11f is substantially in contact with a separate side 25, 27 of the kettle 13. The end edges 37, 39 of each plate 11e, 11f are spaced from the corresponding ends 29, 31 of the kettle 13 to provide heat relief gaps 41.

It is also apparent that in the version depicted in FIG. 6, i.e., a side-edge-overlapped, two-plate version, the article 10 is universal in application to the extent it fits kettles 13 having any one of a relatively broad range of possible side-to-side spacings and having any one of a narrower range of possible end-to-end spacings. As to the latter, such article 10 fits kettles 13 having end-to-end spacings no less than about two inches greater and no more than about four inches greater than the plate dimension between end edges 37 and 39. In other words, the side-edge-overlapped, two-plate version of the article 10 is adjustable in width between kettle sides 25, 27 but not in length between kettle ends 29, 31. As is now apparent, that version of the article 10 incorporating four plates 11 fits a more extensive variety of kettle sizes.

Like the four-plate version described above, a feature of the two-plate version of the article 10 depicted in FIG. 6 is that those apertures 47a in the central region 59 of the kettle 13 where the plates 11 overlap are partially closed while those along the kettle perimeter regions 61 are open for improved heat distribution.

Another two-plate version of the article 10 is shown in FIG. 8. Such version is referred to as an "end-edge-overlapped" article 10. Its universality is limited to use in kettles 13 having sides 25, 27 spaced by the dimension between side edges 34, 36 of the plates 11g, 11h and, as a minimum, having ends 29, 31 spaced by a dimension no less than one to two inches longer than the dimension of the plates 11g, 11h between end edges 37, 39. For a kettle 13 with ends 29, 31 spaced apart by a dimension one to two inches greater than the spacing between the ends 37, 39 of the plates 11g, 11h, the plates 11g, 11h are mounted in registry or "full overlap" with one another.

Such version can also be used with kettles 13 having ends 29, 31 spaced by a dimension no greater than one to two inches longer than the aggregate dimension of the plates 11g, 11h between end edges 37, 39 when the plates 11g, 11h are mounted in their "minimum-overlap" position so that a single rib 43a of each plate 11g, 11h is in registry with a single rib 43a of the other plate 11h, 11g. In the version of the article 10 shown in FIG. 8, all apertures 47 are fully open for all variations in plate overlap. Thus, the chief benefits of that version of the article 10 are to catch food drippings and help prevent flare-ups.

Referring again to FIGS. 1, 4 and 5 the way to use the four-plate version of the article 10 will now be described. Directions such as "left" and "up" are as depicted in such figures.

Assuming the four plates 11a–11d are substantially identical to one another as preferred, the user selects any two plates e.g., plates 11a and 11b, and places them one over the other so that their corresponding end edges 37, 39 are aligned. Their ribs 43a are thereby automatically aligned. The plates 11a, 11b are preferably laid so that the convex surfaces of the ribs 43a are upward as shown in FIG. 2. This avoids grease becoming trapped along the lengths of the ribs 43a as would otherwise occur if the plates 11 were laid with rib concave surfaces upward to form troughs in which grease might collect. Grease-related "rustout" and flare-ups are thereby substantially avoided.

The overlap of the plates 11a, 11b is then slidably adjusted (with ribs 43a in alignment) until the upper side edge 34 of the upper plate 11b and the lower side edge 36 of the lower plate 11a contact their respective kettle sides 25, 27. The two plates 11a, 11b are then bolted together at one end with a #6 carriage bolt 57 and a wing nut 65. These steps are then repeated using the remaining two plates 11c, 11d.

The two bolted-together sets of plates 11 are then placed in the kettle 13 and slid laterally away from one another until the left end edges 37 of the left pair of plates 11a, 11b and the right end edges 39 of the right pair of plates 11c, 11d contact their respective kettle end 29, 31. When so positioned, the ribs 43a of the left pair of plates 11a, 11b and those of the right pair of plates 11c, 11d will likely not be in registry if the plates 11 are made with the specific dimensions set forth herein and if the kettle 13 is one of the five specific sizes mentioned above.

The pairs of plates 11a, 11b and 11c, 11d are then slid inward toward one another until at least one rib 43a of each of the left pair of plates 11a, 11b first comes into registry with at least one rib 43a of the right pair of plates 11c, 11d. When the pairs of plates 11 are so arranged and when the plates 11 are made using the dimensions set forth herein, a one-to-two inch heat relief gap 41 is automatically provided at each end 29, 31 of any one of the five sizes of kettles 13 mentioned above.

Figure 10:
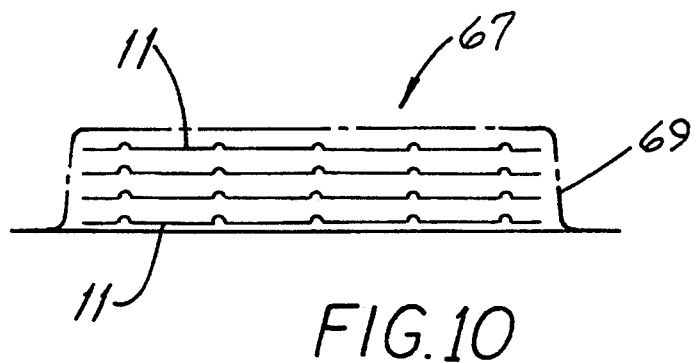
FIG. 10 is a side elevation view of an exemplary kit involving the new heat distribution article. The kit container is shown in dashed outline.

Referring now to FIG. 10, the article 10 is preferably sold as a kit 67 including plates 11 and bolting hardware 57, 65. From the foregoing description, it will be apparent that kits 67 comprising only two plates 11 have utility for certain applications. However, the most highly preferred kit 67 includes four plates 11, preferably substantially identical to one another, packed in a common container 69, e.g., a "blister pack", with appropriate assembly hardware.

The effectiveness of the new heat distribution article 10 in reducing the temperature gradient across the cooking grate surface 23 is evidenced by the following. Tests were conducted using the four-plate version of the article 10 in each of five different kettle sizes. The magnitude of the temperature gradient across the cooking surface 23 of each was measured and the results are tabulated below:

| Kettle Size, Inches | Temperature Gradient, °F. |
| --- | --- |
| 11.5 × 19.5 | 53 |
| 12.75 × 19 | 69 |
| 14.5 × 21.5 | 106 |
| 15.5 × 24.5 | 87 |
| 15 × 26.5 | 99 |

It is apparent from the foregoing that the new heat distribution article 10 is highly effective in retaining such temperature gradient well below the 140°–160° F. range mentioned above.

While only a few preferred embodiments of the inventive article 10 have been described, it should be understood clearly that the descriptions are by way of example and are not limiting. In particular, it should be appreciated that specific dimensions and other parameters of plate 11 are selected in view of specific kettle sizes currently available. The emergence of yet other kettle sizes may necessitate changes in specific dimensions without departing from the invention.

I claim:

1. In the combination of (a) a generally rectangular cooking grill kettle containing a burner and a cooking grate and having a central region, side perimeter regions, kettle ends and kettle sides, and (b) a heat distribution article mounted in the kettle intermediate the burner and the cooking grate, the improvement wherein:

the article is between the burner and the grate and includes a pair of flat plates formed of sheet metal;
each plate has an upper surface vertically spaced from the upper surface of the other plate;
each plate has at least two rows of elongate apertures and the apertures of each row are disposed along a row axis;
the plates are in partial overlapping contact with one another; and,
for each plate, those apertures at the kettle central region are at least partially closed by portions of the other plate; and
those plate apertures at the side perimeter regions are fully open, whereby upward air flow at the central region is restricted, heat is distributed toward the sides of the kettle and food drippings are substantially prevented from falling to the burner.

2. The combination of claim 1 wherein the apertures in at least one plate are elongate in the direction of the row axes.

3. The combination of claim 2 wherein the apertures in both plates are elongate in the direction of the row axes.

4. The combination of claim 1 wherein:
the plates are first and second plates;
each plate includes a plurality of alignment projections;
each projection has a concave portion and a convex portion; and,
the convex portion of at least one projection of the first plate contacts the concave portion of at least one projection of the second plate.

5. The combination of claim 4 wherein the alignment projections are rib-like.

6. The combination of claim 5 wherein:
the row axes are spaced apart by a dimension; and,
the projections are spaced apart by about the same dimension.

7. The combination of claim 1 wherein:
the kettle has a pair of ends and a pair of sides;
each plate has a pair of end edges and a pair of side edges;
a side edge of each plate is substantially in contact with a separate side of the kettle; and,
the end edges of the plates are substantially aligned and are spaced from the ends of the kettle,
whereby heated air flow passages are provided adjacent to the kettle ends and the kettle sides.

8. In the combination of (a) a generally rectangular cooking grill kettle containing a burner and a cooking grate and having a central region, side perimeter regions, kettle ends and kettle sides, and (b) a plate-like heat distribution article mounted in the kettle intermediate the burner and the cooking grate, the improvement wherein:

the article is between the burner and the grate and comprises four plates;
each plate has an upper surface vertically spaced from the upper surface of the other plates;
each plate has at least two rows of elongate apertures and the apertures of each row are disposed along a row axis;
each plate is in partial overlapping contact with another plate; and,
for each plate, those apertures at the kettle central region are at least partially closed by portions of another plate; and,
those plate apertures at the side perimeter regions are fully open, whereby upward air flow at the central region is restricted, heat is distributed toward the sides of the kettle and food drippings are substantially prevented from falling to the burner.

9. The combination of claim 8 wherein the aperatures in at least one plate are elongate in the direction of the row axes.

10. The combination of claim 9 wherein the apertures in all plates are elongate in the direction of the row axes.

11. The combination of claim 8 wherein:
each plate includes a plurality of alignment projections;
each projection has a concave portion and a convex portion; and,
the convex portion of at least one projection of each of three plates contacts the concave portion of at least one projection of another plate.

12. The combination of claim 11 wherein the alignment projections are rib-like.

13. The combination of claim 12 wherein:
the row axes are spaced apart by a dimension; and,
the projections are spaced apart by about the same dimension.

14. A kit for assembling a heat distribution article for use in a cooking grill, the kit including:
at least two flat sheet metal plates, each plate having (a) at least two rows of elongate apertures and (b) a plurality of planar portions coincident with a common plane;
each plate including a plurality of elongate, rib-like alignment projections extending outward from the plane and having a curved cross-sectional shape for nested engagement with the alignment projections of the other plate;
and wherein:
the apertures and the projections are elongate in a direction parallel to one another; and
the plates are contained in a common package.

15. The kit of claim 14 wherein:
the rows are generally parallel and are spaced apart by a dimension;
the alignment projections are rib-like and are spaced apart by about the same dimension.

16. The kit of claim 15 wherein the dimension is in the range of about two inches to about three inches.

17. The kit of claim 16 wherein the dimension is about 2.4 inches.

18. The kit of claim 14 including four plates and all plates are substantially identical to one another.

* * * * *